United States Patent

[11] 3,607,055

| [72] | Inventor | Walter S. Case, Jr. |
| | | Oklahoma City, Okla. |
| [21] | Appl. No. | 868,202 |
| [22] | Filed | Oct. 21, 1969 |
| [45] | Patented | Sept. 21, 1971 |
| [73] | Assignee | Kerr-McGee Chemical Corp. |
| | | Continuation-in-part of application Ser. No. 633,422, Apr. 25, 1967. |

[54] PRODUCTION OF DIVANADIUM CARBIDE BY SOLID-STATE REDUCTION OF VANADIUM OXIDES
15 Claims, No Drawings

[52] U.S. Cl. .................................................. 23/208, 23/203
[51] Int. Cl. ............................................. C01b 31/36, C01b 31/30, C22c 29/00
[50] Field of Search ........................................ 23/208

[56] References Cited
UNITED STATES PATENTS

| 3,334,992 | 8/1967 | Downing et al. | 23/208 A X |
| 3,342,553 | 9/1967 | Buker et al. | 23/208 A |

*Primary Examiner*—M. Weissman
*Attorney*—William G. Addison

ABSTRACT: A process for the solid-state reduction of vanadium oxides to vanadium carbide ($V_2C$). The material is processed in a compacted form, such as a tablet, containing stoichiometric amounts of vanadium oxide and carbon bound with a suitable binder. The charge initially is heated at a rate and an absolute pressure such that gas evolution beginning at about 650° C. is not so rapid as to cause compacted material to disintegrate and then to a temperature above 1,450° C. at final pressures below $10^{12}$ atmospheres. Specifically, this process is suitable for reduction of vanadium pentoxide to vanadium carbide in a single furnacing operation according to the reaction $10V_2O_5+53C \rightarrow 10V_2C+7CO_2+36CO$. Other oxides of vanadium may be used in place of part of the $V_2O_5$.

PRODUCTION OF DIVANADIUM CARBIDE BY SOLID-STATE REDUCTION OF VANADIUM OXIDES

This application is a continuation-in-part of application, Ser. No. 633,422, filed Apr. 25, 1967.

BACKGROUND OF THE INVENTION

Vanadium has been used for many years as an alloying additive in steel making. Most of the vanadium used for this purpose has been in the form of ferrovanadium, which is an iron alloy containing from 35 to 75 percent vanadium. This ferrovanadium has generally been produced by the alumino thermic process, or by the electric furnace method. The addition of small amounts of vanadium imparts added strength, hardness, toughness and wear resistance to a wide variety of alloy and tool steels. While the use of ferrovanadium as a source of vanadium in steel making has been generally satisfactory, nevertheless, vanadium bearing materials which are less expensive and provide higher recoveries of the added vanadium have long been sought by the steel industry. Recently, an interest has developed in using vanadium in the form of its carbides as a source of vanadium in steel compositions, and these carbides have the potential of being less expensive and also of providing for higher recoveries of added vanadium than is the case when ferrovanadium is used. Depending on reaction conditions and thermodynamic considerations, a series of compounds of vanadium, carbon and oxygen may be formed. One desirable form is a compound falling in the range expressed by the formula $VC_{0.42-0.50}O_{0.0-0.10}$ hereinafter called $V_2C$. The present invention provides a process for converting vanadium oxides, including a common commercial source of vanadium, the pentavalent oxide $V_2O_5$, to the more desirable $V_2C$ form by a process which can be performed as a single furnacing step operation. $V_2O_5$ and other oxides of vanadium are not acceptable for addition to steel as a source of vanadium due to low recovery of the vanadium added, and to other operating problems.

It has been generally known for some time that carbides of refractory metals, including vanadium, can be prepared by reacting an oxide of a refractory metal with carbon at elevated temperatures and under vacuum. For example, U.S. Pat. Nos. 2,800,393 and 3,106,456 refer generally to processes involving reduction of refractory metal oxides with carbon to produce a carbide of the refractory metal. However, these prior art processes do not suggest that a $V_2C$ compound can be produced from vanadium oxides by a single furnacing step operation such as is provided by the present invention. Other references known to applicant at this time are U.S. Pat. Nos. 3,334,992 and 3,342,553, as well as a Russian article, "Structure of Carbide Phases of Vanadium" by M. A. Gurevich and B. F. Ormont from Doklady Akedemii Nauk SSSR 1954, XCVI, No. 6, 1165–1168, and a French article, "Reduction of Vanadium Oxides by Carbon Monoxide and Carbon" by Andre Morette, Compt. Rend. Vol. 200, pages 134–136 (1935). These articles disclose the preparation of $V_2C$ from various vanadium oxides which have been compacted with carbon. They do not disclose the preliminary heating step described hereinafter which applicant has discovered is essential to satisfactory commercial operation of the process.

SUMMARY OF THE INVENTION

A vanadium carbide product corresponding substantially to the formula $V_2C$ can be produced according to the process of this invention by reduction of vanadium pentoxide, or mixtures thereof with other vanadium oxides, with carbon. Experimental work showed that the reduction of $V_2O_5$ to $V_2C$ can be expressed by the following equation: $10\ V_2O_5 + 53\ C \rightleftharpoons 10\ V_2C + 7\ CO_2 + 36\ CO$. Further, this reaction may be assumed to take place in three stages approximated by:

$10\ V_2O_5 + 7\ C \rightarrow 4\ V_5O_9 + 7\ CO_2$ (at about 650° C. and a nonoxidizing atmosphere)

$4\ V_5O_{11} + 46\ C \rightarrow 16\ VC + 2\ V_2O_3 + 30\ CO$ (at about 1,200° C. and a nonoxidizing atmosphere)

$16\ VC + 2\ V_2O_3 \rightarrow 10\ V_2C + 6\ CO$ (at above 1,450° C. and absolute pressure of $10^{12}$ atmospheres or less)

The above reactions are written to show the general path of the process and the conditions of pressure and temperature. While the first two reactions do not require high vacuum, generally it is desirable to initially either flush the furnace chamber with inert gas or evacuate the chamber to remove the air therefrom, as the oxygen in the air would react with carbon to produce CO and $CO_2$ gases, and would thereby remove part of the carbon from the charge. The inclusion of enough carbon in the charge to compensate for this reaction provides a satisfactory solution, but it is preferred to evacuate the furnace chamber or flush it with inert gas. These reactions as written are actually simplified, since there are eight distinct vanadium oxide phases between $V_2O_5$ and $V_2O_3$ that may be formed, and vanadium oxycarbides may form rather than all or part of the $VC + V_2O_3$ mixture. However, the reactions as written agree well with experimental gas volume measurements, and no effort was made to detail the exact reaction path.

The charge for the furnace reaction is prepared by grinding and classifying vanadium pentoxide alone or in admixture with other vanadium oxides and a carbon source to a suitable size, such as minus 200 mesh. The dry materials are then proportioned from about 70 to 77 weight percent vanadium oxide (when the oxide is vanadium pentoxide) and from about 30 to 23 percent carbon. A suitable binder is added to the dry material, and in cases where the binder has a carbon content, such as when molasses is used, the carbon content of the binder must be taken into account in the overall mix. The material plus binder is blended and fed to suitable compaction equipment such as a briquette press. Green briquettes from the press are then cured to give adequate physical strength, and then charged to a furnace.

The furnace chamber is then flushed with inert gas or evacuated, or enough additional carbon is included with the charge to react with the oxygen in the chamber. The temperature of the furnace charge is then raised to the point at which the first major gas evolution occurs. It was observed when vanadium pentoxide was the starting material that gas evolution began at about 650° C. and was very rapid. When $V_2O_5$ is used as a starting material, furnace temperature and pressure must be controlled during this off-gassing to prevent the reaction from being so rapid as to cause the briquettes to disintegrate. Other vanadium oxides do not give this rapid gas evolution. It is not necessary that the furnace be under vacuum at this stage of the process, but provision must be made for removing the evolved gases to prevent a buildup in the furnace. After gas evolution at this lower temperature has reached a maximum and begun to decrease in rate, the furnace charge then is heated to the final processing temperature of 1,450° C. or greater and held there until gas has essentially ceased to evolve from the furnace charge. The pressure within the furnace chamber during this holding period is reduced to $10^{12}$ atmospheres or less, and preferably to an absolute pressure of about 1 mm. Hg. or less. This may be done by mechanical vacuum pumps or by steam ejectors or other suitable means. Laboratory results indicated that the $V_2C$ phase was not predominate in the product until the temperature exceeded 1,450° C. and the pressure was reduced to less than $10^{12}$ atmospheres. The furnace charge is maintained at above 1,450° C. until the reaction is essentially completed and a predominantly $V_2C$ product has been formed. The furnace charge may be heated to as high as 1,600° C. or more, but such high temperatures are not necessary, and lead to problems of equipment, materials of construction, and sintering of the charge. The time for the reaction to go to completion depends upon several process variables, but generally will be at least 1 hour, and in many cases will be 4 to 6 hours or even more. This time period is in addition to the time required to bring the charge to the maximum holding temperature, which may be several hours. At the end of the reaction period, the furnace charge is allowed to cool while the vacuum is maintained, or the furnace chamber may be repressurized with inert gas, such as helium or argon, and the charge then allowed to cool. Preferably the inert gas is circulated through a heat exchanger in a closed loop to cool the charge to a temperature at which it will not reoxidize readily on exposure to air (about 260° C.). The product may then be removed from the furnace, and may be crushed to a suitable size, such as nominal 1-inch particles.

The source of carbon used in the furnace charge is not critical and may be any one of calcined petroleum coke, metallurgical coke, gilsonite coke or other high carbon material. Primary considerations in the selection of carbon for this process are high carbon content with a minimum of impurities that would affect the product. Metallurgical coke and gilsonite coke were found to be satisfactory for the process, with gilsonite coke being preferred over metallurgical coke due to its higher carbon content and lower ash.

The binder which is added to the dry material to give strength to the briquettes may be any of several available materials, such as water, molasses, starch, polyvinyl alcohol, lime, combinations of these, or others. A preferred binder for this process is molasses diluted with sufficient water to provide good wetting. The carbon content of the molasses is accounted for in preparing the mixture of vanadium oxide and carbon during the initial charge preparation.

The size to which the carbon source and vanadium oxide must be ground prior to formation of the furnace charge is not critical, and may be from about minus 24 mesh to minus 400 mesh, with about a minus 200 mesh material being preferred due to its handling characteristics, physical properties and reaction kinetics.

It is not essential that the reaction products be briquetted or formed into pellets, but handling characteristics are much improved if this is done. Any suitable equipment may be used for this purpose, and a forming pressure of 10,000 to 40,000 p.s.i. gives compacts having satisfactory handling properties and density.

The product prepared by the process of this invention corresponds substantially to the formula $VC_{0.42-0.50}O_{0.0-0.1}$, and X-ray diffraction analyses show that this is the only vanadium carbide phase present when the process is carried out at the preferred conditions. When the amount of carbon in the initial charge is significantly above the stoichiometric amount required for $V_2C$ production, the product may contain other vanadium carbide phases.

These other phases, as determined by X-ray diffraction analysis, may include $VC_{0.5-0.7}O_{0.0-0.14}$, $VC_{0.7-0.96}O_{0.0-0.05}$, and VO. The oxygen content of the product, when the reaction is carried out at the preferred conditions, will generally be less than one percent by weight. When the carbon content of the starting material is 25.5 percent, the reaction temperature is 1,570° C., and the pressure in the reaction chamber is less than 1 mm. Hg., the oxygen content of the product will generally be about one-half of 1 percent or less.

PREFERRED EMBODIMENT

In a preferred embodiment of the invention, designed to produce 3 tons per day of $V_2C$ by the reduction of vanadium pentoxide with low ash coke in an induction or resistance heated vacuum furnace, 10,000 pounds of vanadium pentoxide and 3,240 pounds of gilsonite coke per day are ground to minus 200 mesh, and a molasses-in-water binder is added sufficient to give good binding of material. The mixture of charge plus binder is passed through a blender and then fed to a briquette press. Green briquettes are air cured or dried and then charged to furnace crucibles. A loaded crucible is placed in a furnace, which may be for example one of several furnaces each having a capacity of two tons. The furnace chamber is evacuated or flushed with inert gas, and the charge temperature is raised to about 650° C. and held there until the evolution of gas has substantially ceased. The charge is then heated to 1,595° C. and is held at this temperature for 6 hours while the pressure during this period is reduced to less than 1 mm. Hg. absolute and maintained at this level. The furnace is then shut down, and the furnace chamber is repressurized with helium, which is circulated through the furnace chamber in a closed loop with a heat exchanger to cool the charge to about 260° C. The crucible is then removed, and the product is emptied and crushed to a nominal 1-inch size.

EXAMPLE 10,524 grams of green briquettes were prepared by dry blending 6,926 grams of minus 200 mesh $V_2O_5$ and 2,245 grams of minus 200 mesh gilsonite coke and then mixing the blend with 2,450 ml. of a 10-volume-percent molasses-in-water binder. The wet mix was dried to 11 percent moisture and then briquetted at about 10,000 p.s.i. forming pressure. The briquettes were dried at 150° C. and then charged to a furnace. The furnace chamber was evacuated to remove air and then heated to 790° C. over a 28-minute period and then held at this temperature for 28 minutes. The vacuum was maintained while the furnace chamber temperature was raised to 1,345° C. over a 20-minute period. The furnace chamber was held at this temperature for 50 minutes. The furnace was then heated to 1,610° C. in 8 minutes and held at this temperature for 7 hours. The pressure in the chamber during the holding period was reduced to below 1 mm. Hg. absolute and maintained at this level. Power to the furnace was then turned off, and the chamber was repressurized with helium to slightly above atmospheric pressure (to keep air out of the chamber during cooling and thus prevent oxidation of the product). The chamber was allowed to cool, and the product removed from the furnace. The product was $V_2C$ (determined by X-ray diffraction analysis) and contained 86.4 percent V.

What is claimed is:

1. A process for producing $V_2C$ from vanadium pentoxide comprising:
   a. compacting finely divided vanadium pentoxide with a carbon-containing material, the available carbon from such material being substantially equal to the amount required to combine with all the vanadium and oxygen present in the mixture and form $V_2C$ therefrom in accordance with the equation $10\ V_2O_5 + 53\ C \rightarrow 10\ V_2C + 7\ CO_2 + 36\ CO$,
   b. charging the resulting compacted mixture to a furnace,
   c. heating the charge to a temperature of 650–800° C. and maintaining it within this range until gas evolution from the charge mixture has substantially ceased,
   d. further heating the charge, without removing the same from the furnace or allowing it to cool substantially below the temperature of step (c), to a temperature to of at least 1,450° C. and at an absolute pressure of not more than $10^{12}$ atmospheres until substantially all of the vanadium present in the charge is converted to a vanadium carbide corresponding to the formula $V_2C$, and
   e. maintaining the product in a nonoxidizing atmosphere until it is cooled to a temperature below 260° C.

2. The process of claim 1 wherein the pressure is maintained at about 1 millimeter mercury or less during at least a portion of the time that the charge is being heated at above 1,450° C.

3. The process of claim 1 wherein the carbon-containing material is gilsonite coke.

4. The process of claim 1 wherein the vanadium pentoxide and carbon-containing material are mixed with a binder prior to said compaction.

5. The process of claim 1 wherein lower oxides of vanadium are substituted for a portion of the vanadium pentoxide.

6. A process for producing $V_2C$ from vanadium pentoxide comprising:
   a. compacting finely divided vanadium pentoxide with a carbon-containing material, the available carbon from such material being substantially equal to the amount required to combine with all the vanadium and oxygen present in the mixture and form $V_2C$ therefrom in accordance with the equation $10\ V_2O_5 + 53\ C \rightarrow 10\ V_2C + 7\ CO_2 + 36\ CO$,
   b. charging the resulting compacted mixture to a furnace, c. heating the charge to a temperature of 650–800° C. and maintaining it within this range until gas evolution from the charge mixture has begun to decrease in rate, d. further heating the charge, without removing same from the furnace or allowing it to cool substantially below the temperature of step (c), to a temperature to of at least 1,450° C. and at an absolute pressure of not more than $10^{12}$ atmospheres until substantially all of the vanadium present in the charge is converted to a vanadium carbide corresponding to the formula $V_2C$, and e. maintaining the product in a nonoxidizing atmosphere until it is cooled to a temperature at which the material will not rapidly reoxidize upon exposure to air.

7. The process of claim 6 wherein the pressure is maintained at about 1 millimeter mercury or less during at least a portion of the time that the charge is being heated at above 1,450° C.

8. The process of claim 6 wherein the carbon-containing material is gilsonite coke.

9. The process of claim 6 wherein the vanadium pentoxide and carbon-containing material are mixed with a binder prior to said compaction.

10. The process of claim 6 wherein lower oxides of vanadium are substituted for a portion of the vanadium pentoxide.

11. A process for producing $V_2C$ from vanadium pentoxide comprising:

a. compacting finely divided vanadium pentoxide with a carbon-containing material in proportions of from about 70 to 77 weight percent vanadium pentoxide and from about 30 to 23 weight percent carbon, b. charging the resulting compacted mixture to a furnace, c. heating the charge at a rate and an absolute pressure such that gas evolution beginning at about 650° C. is not so rapid as to cause said compacted mixture to disintegrate, d. further heating the charge, without removing same from the furnace or allowing it to cool substantially below the temperature of step (c), to a temperature to of at least 1,450° C. and at an absolute pressure of not more than $10^{12}$ atmospheres until substantially all of the vanadium present in the charge is converted to a vanadium carbide corresponding to the formula $V_2C$, and e. maintaining the product in a nonoxidizing atmosphere until it is cooled to a temperature at which the material will not rapidly reoxidize upon exposure to air.

12. The process of claim 11 wherein the pressure is maintained at about 1 millimeter mercury or less during at least a portion of the time that the charge is being heated at above 1,450° C.

13. The process of claim 11 wherein the carbon-containing material is gilsonite coke.

14. The process of claim 11 wherein the vanadium pentoxide and carbon-containing material are mixed with a binder prior to said compaction.

15. The process of claim 11 wherein lower oxides of vanadium are substituted for a portion of the vanadium pentoxide.

UNITED STATES PATENT OFFICE
CERTIFICATE OF CORRECTION

Patent No. 3,607,055      Dated September 21, 1971

Inventor(s) Walter S. Case, Jr.

It is certified that error appears in the above-identified patent and that said Letters Patent are hereby corrected as shown below:

On the cover sheet in the ABSTRACT, column 1, line 75, column 2, lines 54 and 60, column 4, line 50, column 5, line 8, and column 6, line 10, "$10^{12}$", each occurrence, should read -- $10^{-2}$ --.

Signed and sealed this 24th day of October 1972.

(SEAL)
Attest:

EDWARD M. FLETCHER, JR.     ROBERT GOTTSCHALK
Attesting Officer           Commissioner of Patents